United States Patent [19]

Labougle

[11] Patent Number: 5,560,452
[45] Date of Patent: Oct. 1, 1996

[54] REINFORCEMENT DEVICE FOR CARBON BRAKE DISKS, AND A BRAKE DISK FITTED WITH SUCH DEVICES

[75] Inventor: Michel Labougle, Levis St-Nom, France

[73] Assignee: Messier-Bugatti, Velizy Villacoublay, France

[21] Appl. No.: 436,860

[22] Filed: May 8, 1995

[30] Foreign Application Priority Data

May 11, 1994 [FR] France ................... 94 05806

[51] Int. Cl.$^6$ .................................................. F16D 65/12
[52] U.S. Cl. ................. 188/218 XL; 192/107 R
[58] Field of Search ............... 188/218 XL, 26, 188/58, 17, 18 A, 218 R; 192/107 R

[56] References Cited

U.S. PATENT DOCUMENTS

| | | |
|---|---|---|
| 3,891,066 | 1/1975 | Anderson . |
| 3,927,740 | 12/1975 | Zarembka . |
| 4,007,814 | 2/1977 | Berger . |
| 4,013,147 | 3/1977 | Anderson .......................... 188/218 XL |
| 4,083,434 | 4/1978 | Pinter . |
| 4,465,165 | 8/1984 | Bok .................................. 188/218 XL |
| 4,511,021 | 4/1985 | Grider ............................... 188/218 XL |
| 4,557,356 | 12/1985 | Petersen ............................... 188/218 A |
| 4,784,246 | 11/1988 | Edmisten ........................... 188/218 XL |
| 4,890,700 | 1/1990 | Guichard . |
| 5,273,140 | 12/1993 | Berwanger . |

FOREIGN PATENT DOCUMENTS

| | | |
|---|---|---|
| 2040586 | 4/1969 | France . |
| 2266054 | 3/1975 | France . |
| 2546250 | 5/1983 | France . |
| 2611010 | 2/1988 | France . |

*Primary Examiner*—Matthew C. Graham
*Attorney, Agent, or Firm*—Sixbey, Friedman, Leedom & Ferguson, PC; Gerald J. Ferguson, Jr.; Donald R. Studebaker

[57] ABSTRACT

The invention relates to a reinforcement device for reinforcing the open slots of a carbon brake disk. According to the invention, each slot is provided both with a U-shaped insert whose two lateral limbs are disposed to face the lateral faces of the corresponding coupling bar, and with two channel-section caps that extend towards each other so as to surround the two lateral limbs of the insert completely, each cap having a free end edge that occupies a plane that is parallel to the corresponding inside face and that, on initial assembly, stands slightly projecting relative to said face, thereby enabling said free end edge to be brought exactly into the plane of said inside face after the brake has been used during a running-in period.

12 Claims, 1 Drawing Sheet

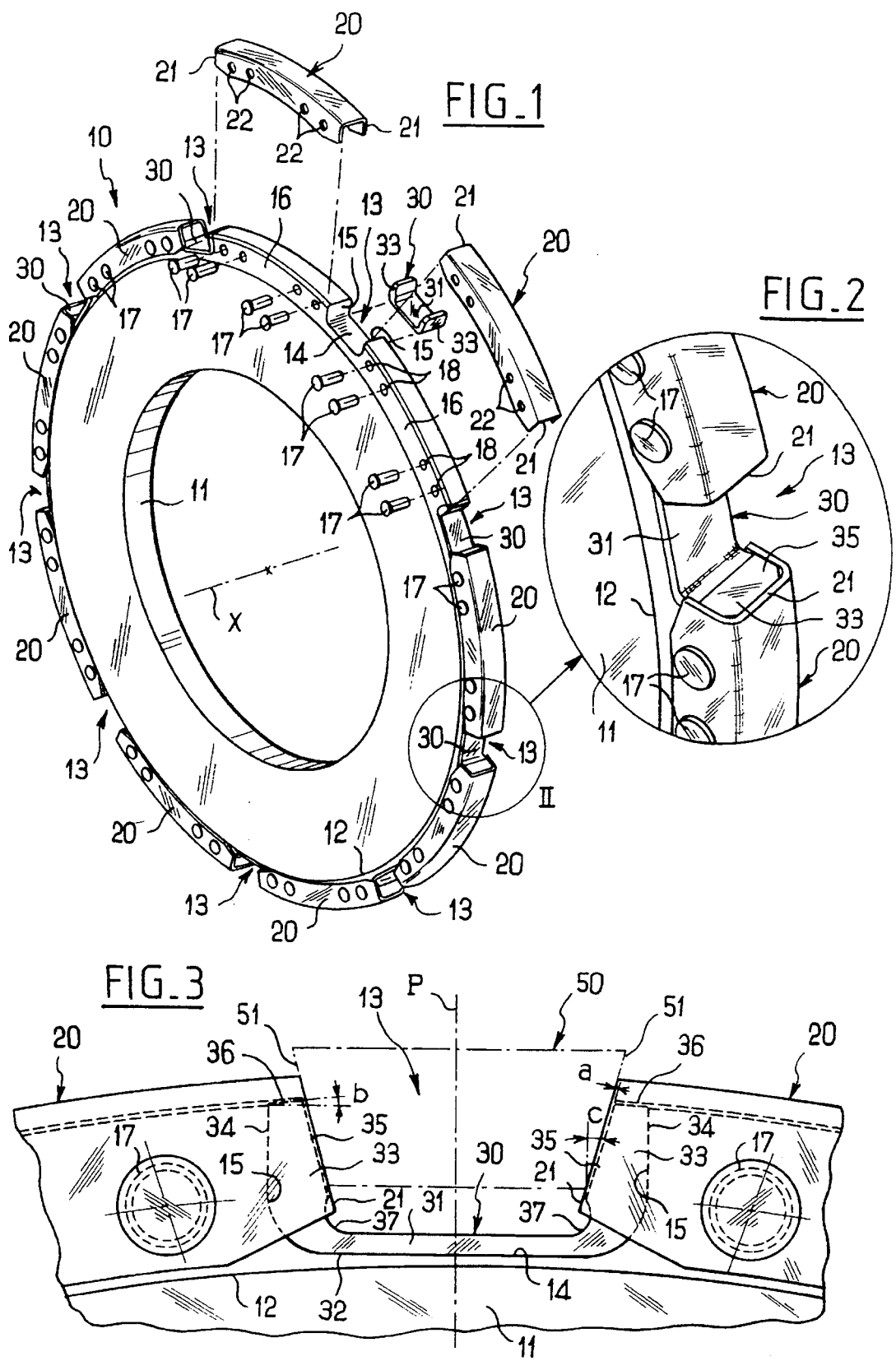

REINFORCEMENT DEVICE FOR CARBON BRAKE DISKS, AND A BRAKE DISK FITTED WITH SUCH DEVICES

The present invention relates to the field of aircraft disk brakes, and more particularly to brake disks made of carbon.

BACKGROUND OF THE INVENTION

Over the last 20 years, brake disks have been made of carbon because it has characteristics at the high temperatures encountered while brakes are in operation that are much better than the characteristics of the metals that used to be used for brake disks.

At their periphery, brake disks have open slots with faces that are parallel or inclined, each slot receiving an axial bar (of rectangular or trapezium-shaped section), braking torque then being transmitted via the lateral faces of the slots and the axial bars. Between them, the slots define circumferential segments which are totally or partially covered by curved channel-section caps open towards the body of the disk, which caps are held in place by through bolts or rivets extending parallel to the axis of the disk. Such a disposition can equally well be provided both for rotor disks that transmit braking torque to the wheel via the corresponding axial bars mounted inside the wheel (slots on the outer periphery of the disk), and for stator disks (slotted on the inside periphery of the disk, receiving bars or splines on the brake torque tube).

To prevent the bars from coming directly into contact with the carbon, the lateral faces of the slots that serve to transmit braking torque are protected by a thickness of metal which either forms a portion of the caps, or else is constituted by an insert.

Numerous solutions have already been proposed for providing such protection.

Particular mention may be made of the following documents: U.S. Pat. No. 3,924,740, U.S. Pat. No. 3,972,395, U.S. Pat. No. 4,007,814, and U.S. Pat. No. 4,083,434, which describe configurations in which each slot is bridged circumferentially by a reinforcing cap having a setback whose lateral walls bear against the lateral faces of the slot in the carbon rotor disk. In a variant, the Applicant has proposed a cap or "rider" overlying each circumferential segment of the carbon disk, said cap having two parallel end walls protecting the lateral faces of the slots (U.S. Pat. No. 4,890,700), that solution having the advantage of facilitating installation of the caps and of providing the circumferential segments with good protection against oxidation.

For solutions of the type having keyway members or "inserts", mention may be made of document U.S. Pat. No. 3,891,066 which describes trapezium-shaped keyway members which are held axially in position by two annular rings disposed on either side of the outer periphery of the disk, and which are held radially in place by rivets passing through the two rings. It should be observed that the peripheral edge is then bare, and thus poorly protected against oxidation. Document U.S. Pat. No. 4,784,246 describes hood-shaped half-inserts each covering one lateral face of a slot together with the surrounding zone of the disk, with radial support being provided by snap-fastening a curved tab in a notch. An analogous approach is to be found in document FR-A-2 546 250. Mention may also be made of document U.S. Pat. No. 5,273,140 which describes annular inserts having peripheral grooves. In those various solutions, the non-rubbing portions of the carbon disk are poorly protected against corrosion.

Finally, it is of interest to mention document U.S. Pat. No. 4,465,165 which illustrates a reinforcing device constituted, for each slot of the disk, both by means of a U-shaped insert whose outside profile corresponds to the profile of the slot, having a central limb that bears against the bottom of the slot, and two lateral limbs whose inside faces are disposed to face the lateral faces of the corresponding coupling bar, and by means of two channel-section caps each covering a portion of a respective circumferential segment adjacent to the slot, and being fixed to the corresponding segments by rivets. It should be observed that the inside faces of each of the U-shaped inserts are projecting relative to the free end edges of two adjacent channel-section caps so that contact with the lateral faces of the corresponding coupling bar takes place exclusively via the inside faces of the U-shaped insert.

Finally, it may be observed that each of the two above approaches has its own advantages and drawbacks when it comes to transmitting braking torque, to staying in place during operation, and to providing mechanical and/or anti-oxidation protection for the non-rubbing portions of a carbon disk.

OBJECTS AND SUMMARY OF THE INVENTION

An aim of the invention is to design a reinforcing device whose disposition makes it possible to combine the largest possible number of the advantages of the two above-described approaches.

Thus, the object of the invention is to provide a reinforcing device whose disposition makes it possible to optimize the transmission of braking torque while providing the best possible protection to the carbon disk, regardless of whether it is a rotor disk or a stator disk.

More particularly, the present invention provides a reinforcing device for a carbon brake disk fitted to an aircraft wheel, which disk has a plurality of open slots in its periphery defining circumferential segments and providing rotary coupling for the disk by means of associated axially-extending bars, said device being constituted for each slot both by means of a U-shaped insert whose outside profile corresponds to the profile of the slot, the insert having a central limb that bears against the bottom of the slot, and two lateral limbs whose inside faces are disposed to face the lateral faces of the corresponding coupling bar, and by means of two channel-section caps each covering at least a portion of a respective circumferential segment adjacent to the slot, and being fixed to said respective segments by means of rivets or the like, wherein said channel-section caps extend towards each other so as to surround both limbs of the insert completely, each cap having a free end edge that extends in a plane parallel to the respective inside face and that is slightly projecting relative to said face on initial assembly, such that said free end edge is brought exactly into the plane of said inside face after a running-in period of brake use.

Preferably, on assembly, the free end edge of each channel-section cap projects relative to the inside face of the corresponding lateral limb of the U-shaped insert by a few tenths of a millimeter, and in particular by about five tenths of a millimeter.

In a particular embodiment, the inside faces of the U-shaped insert are symmetrically inclined to flare outwards relative to the midplane of the slot. In particular, the angle of inclination of the inside faces may lie in the range about 10° to about 15°, and the two lateral limbs of the U-shaped insert may have outside faces which are parallel to the midplane of the slot.

Also advantageously, the top edges of the lateral limbs of the U-shaped insert slope slightly relative to the central limb of said insert, thereby causing them to be tangential to the adjacent inside faces of the corresponding caps. In particular, the angle of inclination of the top edges is about 5°.

It is also advantageous for the inside of the U-shaped insert to have setbacks where its lateral limbs join its central limb. In particular, each setback has a profile in the form of a circular arc that is connected via an obtuse angle to the inside face of the corresponding lateral limb.

Finally, provision may be made for the central limb of the U-shaped insert to be of constant thickness that is less than the constant or varying thickness of the lateral limbs of said insert.

The invention also provides a carbon brake disk having open peripheral slots that is fitted, in each of its slots, with a reinforcing device having at least one of the features specified above.

BRIEF DESCRIPTION OF THE DRAWING

Other characteristics and advantages of the invention appear more clearly in the light of the following description of a particular embodiment given with reference to the accompanying drawing, in which:

FIG. 1 is a perspective view of a carbon brake disk of the invention, showing a rotor disk, and in exploded view two caps on either side of a U-shaped insert;

FIG. 2 is a view on a larger scale of a detail II of FIG. 1; and

FIG. 3 is a front view on a larger scale of the zone around a slot, showing more clearly the particular disposition of the U-shaped insert and of the two adjacent caps.

MORE DETAILED DESCRIPTION

There follows a description in greater detail of a particular embodiment of a carbon brake disk of the invention as applied to a rotor disk, however it should be understood that the invention applies equally well to stator disks (in which case the slots are provided on the inside periphery of the carbon disk to receive bars or splines on the torque tube of the brake).

FIG. 1 shows a rotor carbon brake disk 10 having open peripheral slots 13, which disk comprises a flat carbon ring 11 about an axis X, the lateral faces thereof serving to perform braking action by co-operating with stator disks (not shown herein), the circular outline of the friction zone being referenced 12. The open slots 13 define circumferential segments 16. The figure shows a disk having nine open slots 13, however the number nine is merely an example. Each slot 13 has a bottom 14 and two lateral faces 15 via which braking torque is transmitted. In conventional manner, channel-section caps referenced 20 are provided that are placed over the circumferential segments 16 of the disk 10. These caps are held in place by rivets, bolts, or the like 17, that pass through corresponding holes 18 formed in the circumferential segments 16, and through holes 22 formed in the side walls of said caps. In the present case, each channel-section cap 20 covers one entire circumferential segment 16, thereby presenting the advantage of conferring optimum protection against oxidation for the outer peripheral edge of the carbon ring 11, however this is not essential in the context of the present invention insofar as it would be possible to provide pairs of half-caps, each covering a portion only of a circumferential segment.

Each slot 13 is provided with a U-shaped insert 30 whose outer profile matches that of the slot. The U-shaped insert is in the form of a portion of a channel section bar that extends parallel to the direction of the axis X of the disk.

Reference is now made to FIG. 3 for a more detailed description of the particular structure of the U-shaped insert 30, and of the relative disposition of two channel-section caps 20 adjacent to said insert.

The U-shaped insert 30 comprises a central limb 31 which bears against the bottom 14 of the slot 13, together with two lateral limbs 33 whose inside faces 35 are disposed to face the lateral faces 51 of a corresponding coupling bar 50 that is represented herein by chain-dotted lines only, said bar extending in an axial direction and being fixed to the inside surface of the wheel (not shown herein). Reference P designates the midplane of the slot, which plane is a plane of symmetry for the U-shaped insert 30 and for the corresponding two ends of the overlying caps 20.

The free end edge of each cap is referenced 21, which end edge is in the form of a U-shape lying in an end plane.

According to an essential aspect of the invention, the channel-section caps 20 extend towards each other far enough to completely surround the two lateral limbs 33 of the U-shaped insert 30, thereby defining free end edges 21 that occupy planes parallel to the corresponding inside faces 35 of the lateral limbs of the insert, and being slightly projecting relative to the corresponding face on initial assembly, such that the free end edge comes to lie exactly in the plane of said inside face only after a running-in period of brake use.

In this way, when the brake disks are installed in a wheel so that the bars 50 penetrate into the corresponding slots 13, there is direct contact between the lateral faces 51 of the bar and the free end edges 21 of the channel-section caps 20, but no contact is made for the time being with the inside faces 35 of the lateral limbs 33. However, after a running-in period, when the brake is actuated, this extra thickness at the ends of the caps 20 is compressed or "upset" so as to bring the free end edges 21 exactly level with the planes of the inside faces 35. This ensures that braking torque can be transmitted in optimum manner since tolerances associated with the rivets (and necessary to enable them to be installed) give rise to small displacements of the caps, but these are completely absorbed by such initial running-in of the brake.

Reference a designates the small extent to which the free end edge 21 of each channel-section cap 20 stands proud, on assembly, relative to the corresponding inside face 35. In practice, this distance a is of the order of a few tenths of a millimeter, and in particular it may be about five tenths of a millimeter.

In the embodiment shown herein, the inside faces 35 of the U-shaped inserts 30 are inclined symmetrically so as to flare outwardly at an angle c relative to the midplane P of the slot, with the value of the angle c lying, for example, in the range about 10° to about 15°. Nevertheless, the invention is not limited in any way to there being any such angle c, and it would also be possible to implement the invention in such a way that the angle c is zero, i.e. so that the inside faces 35 are parallel to the midplane P. However, under such circumstances, it would still be necessary to apply the fundamental principle whereby, on assembly, the free end edges 21 of the caps 20 (now parallel to the midplane P) stand proud a little from the faces 35.

In particular, the two lateral limbs 33 of the U-shaped insert 30 have outside faces 34 that are parallel to the midplane P of the slot. Thus, the slot itself is rectangular, unlike conventional slots which are trapezium-shaped. Although not essential, it is known that rectangular slots have the advantage, during rotation, of generating no force tending to expel the bar from the slot due to the radial component of the transmitted force.

FIG. 3 also shows that the top edges 36 of the lateral limbs 33 of the U-shaped inserts 30 are inclined by a small angle relative to the central limbs 31 so as to be tangential to the adjacent inside faces of the corresponding caps 20. This angle which is referenced b, may be about 5°, for example.

In this manner, the ends of the channel-section caps 20 fit accurately over the lateral limbs 33 of the U-shaped insert 30, thereby ensuring excellent axial and radial support for the insert without significant play.

It can also be observed that the inside of the U-shaped insert 30 has setbacks 37 where the lateral limbs 33 join the central limb 31 of the insert. These setbacks 37 may, for example, have a profile in the form of a circular arc that connects via an obtuse angle to the inside face 35 of the corresponding lateral limb 33. Such setbacks are advantageous to avoid any risk of interference with the bars of the wheel.

Provision may be made for the central limb 31 of the U-shaped insert 30 to be of constant thickness that is less than the constant or varying thickness of the lateral limbs 33 of said insert. As an indication, for a slot having a circumferential width of about thirty millimeters, it would be possible to use a U-shaped insert having a width of about thirteen millimeters, with a central limb having a thickness of about one-and-a-half millimeters, while each of its lateral limbs 33 has a maximum thickness of about four millimeters and tapers down to an end adjacent to the edge 36 where its thickness is about two millimeters.

After initial running-in of the brake the resulting exact correspondence that is obtained between the plane of the free end edge 21 of each cap 20 and the corresponding inside face 35 makes it possible to optimize transmission of braking torque, with balanced sharing between take-up via the lateral limbs of the U-shaped insert 30 and take-up via the channel-section caps 20, which take-up passes through the fixing rivets 17. Each U-shaped insert 30 is held accurately in place by the caps 20 such that the planeness obtained by running-in is not altered in operation. Furthermore, it can be observed that the non-rubbing portions of the disk are well protected by the channel-section caps 20, both mechanically and against oxidation.

When the invention is applied to stator disks, the slots provided on the inside periphery of the disk ring receive respective U-shaped inserts whose lateral limbs are slightly set back, on assembly, relative to the free end edges of the adjacent caps that serve to provide axial and radial retention of the insert, thus providing, as for rotor disks, exact correspondence between the torque-transmitting surfaces after a running-in period for the brake.

The invention is not limited to the particular embodiment described above, but on the contrary extends to any variant that uses equivalent means to reproduce the essential characteristics specified above.

I claim:

1. A reinforcing device for a carton brake disk fitted to an aircraft wheel, which disk has a plurality of open slots in its periphery defining circumferential segments and providing rotary coupling for the disk by means of associated axially-extending bars, said device being constituted for each slot both by means of a U-shaped insert whose outside profile corresponds to the profile of the slot, the insert having a central limb that bears against the bottom of the slot, and two lateral limbs whose inside faces are disposed to face the lateral faces of the corresponding coupling bar, and by means of two channel-section caps each covering at least a portion of a respective circumferential segment adjacent to the slot, and being fixed to said respective segments, wherein said channel-section caps extend towards each other so as to surround both lateral limbs of the insert completely, each cap having a free end edge that extends in a plane parallel to the respective inside face and that is slightly projecting relative to said face on initial assembly, such that said free end edge is brought exactly into the plane of said inside face after a running-in period of brake use.

2. A device according to claim 1, wherein, on assembly, the free end edge of each channel-section cap projects relative to the inside face of the corresponding lateral limb of the U-shaped insert by a few tenths of a millimeter.

3. A device according to claim 1, wherein the inside faces of the U-shaped insert are symmetrically inclined to flare outwards relative to the midplane of the slot.

4. A device according to claim 3, wherein the angle of inclination of the inside faces lies in the range about 10° to about 15°.

5. A device according to claim 3, wherein the two lateral limbs of the U-shaped insert have outside faces which are parallel to the midplane of the slot.

6. A device according to claim 1, wherein the top edges of the lateral limbs of the U-shaped insert slope slightly relative to the central limb of said insert, thereby causing them to be tangential to the adjacent inside faces of the corresponding caps.

7. A device according to claim 6, wherein the angle of inclination of the top edges is about 5°.

8. A device according to claim 1, wherein the inside of the U-shaped insert has setbacks where its lateral limbs join its central limb.

9. A device according to claim 8, wherein each setback has a profile in the form of a circular arc that is connected via an obtuse angle to the inside face of the corresponding lateral limb.

10. A device according to claim 1, wherein the central limb of the U-shaped insert is of constant thickness that is less than a thickness of the lateral limbs of said insert.

11. A device according to claim 2, wherein the free end edge of each channel-section cap projects relative to the inside face of the corresponding lateral limb of the U-shaped insert by about five tenths of a millimeter.

12. A carbon disk having open peripheral slots having fitted in each of said slots a reinforcing device for providing rotary coupling for the disk by means of associated axially-extending bars, said device including a U-shaped insert whose outside profile corresponds to the profile of the slot, the insert having a central limb that bears against the bottom of the slot, and two lateral limbs whose inside faces are disposed to face the lateral faces of the corresponding coupling bar, and by means of two channel-section caps each covering at least a portion of a respective circumferential segment adjacent to the slot, and being fixed to said respective segments, wherein said channel-section caps extend towards each other so as to surround both lateral limbs of the insert completely, each cap having a free end edge that extends in a plane parallel to the respective inside face and that is slightly projecting relative to said face on initial assembly, such that said free end edge is brought exactly into the plane of said inside face after a running-in period of brake use.

* * * * *